O. G. WORSLEY.
VEHICLE WHEEL.
APPLICATION FILED NOV. 27, 1909.

977,846.

Patented Dec. 6, 1910.

Witnesses:
Robert T. Brown,
John R. Giffen

Inventor:
Otto G. Worsley

UNITED STATES PATENT OFFICE.

OTTO G. WORSLEY, OF BANGOR, MICHIGAN.

VEHICLE-WHEEL.

977,846.  Specification of Letters Patent.  Patented Dec. 6, 1910.

Application filed November 27, 1909.  Serial No. 530,277.

*To all whom it may concern:*

Be it known that I, OTTO G. WORSLEY, a citizen of the United States, and a resident of Bangor, county of Van Buren, and State of Michigan, have invented certain new and useful Improvements in Vehicle-Wheels, of which the following is a specification.

This invention relates to vehicle wheels, and the principal object of the same is to provide a cushioned wheel that will absorb all shocks and jars incidental to the travel thereof and which, when used as a driver for vehicles of the motor propelled type, will provide for a gradual start of the vehicle, which conduces to a longer wear of the vehicle and also to the comfort of the occupants.

In carrying out the objects of the invention generally stated above, it will be understood, of course, that the essential features thereof are necessarily susceptible of changes in details and structural arrangements, one preferred and practical embodiment of which is shown in the accompanying drawings, wherein:—

Figure 1:
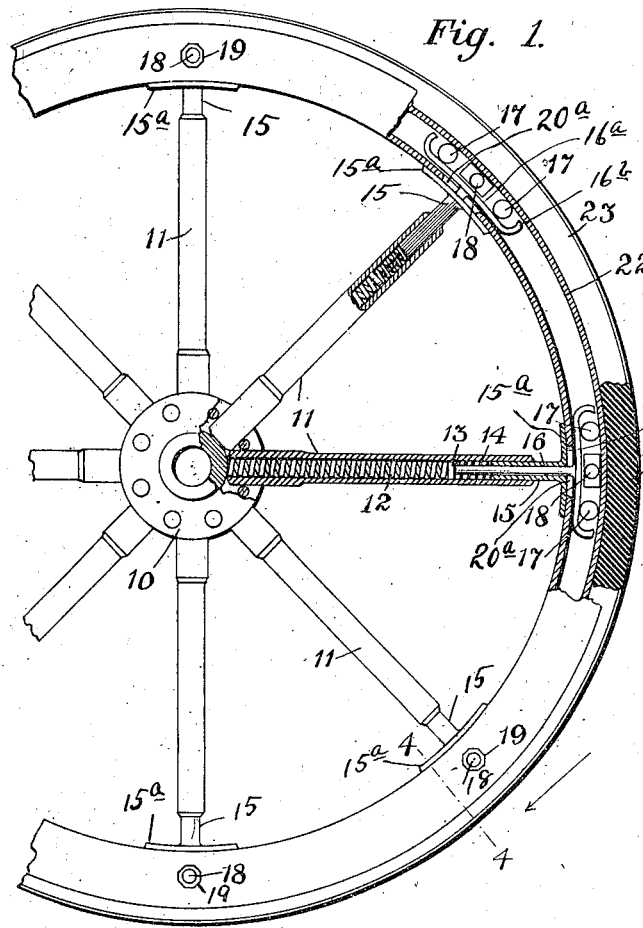
Figure 4:
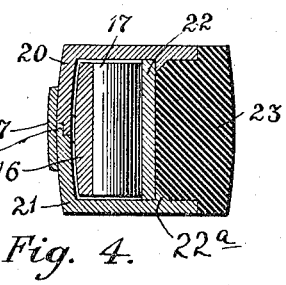
Figure 5:
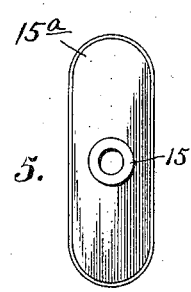
Figure 3:
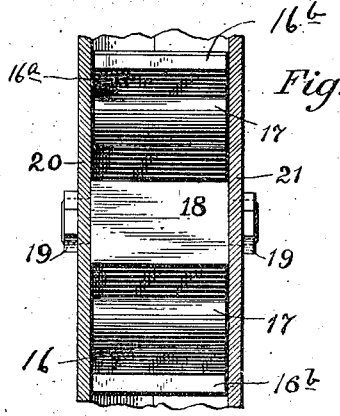
Figure 2:
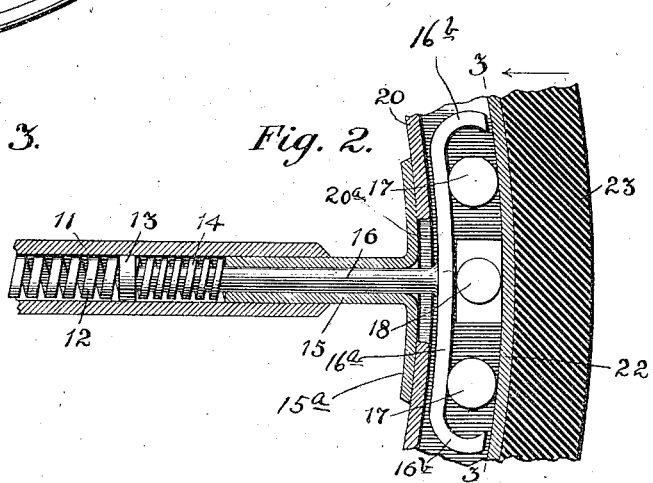

Figure 1 is a fragmentary view in side elevation, partly in section, of the improved wheel. Fig. 2 is an enlarged fragmentary sectional view showing the connection between the spokes and wheel rim. Fig. 3 is a fragmentary sectional view of the wheel rim taken on the line 3—3, Fig. 2. Fig. 4 is a transverse sectional view taken on the line 4—4, Fig. 1. Fig. 5 is a detail plan view of a rim plate and the guide sleeve carried thereby.

Referring to said accompanying drawings by numerals it will be seen that the improved wheel comprises a hub 10 from which the hollow spokes 11 radiate. A coil spring 12 is fitted in each spoke 11, one end of said spring bearing against hub 10 and the other end bearing against a flat annular head 13 carried by one end of a shank 16. Shank 16 is slidable through a sleeve 15 projecting from a rim plate $15^a$, said sleeve telescoping with the free end of spoke 11. A spring 14 is coiled about shank 16, one end of said spring bearing against shank head 13 and the other end bearing against the free end of sleeve 15.

The wheel rim is composed of two complemental sections 20—21, the meeting edges of which having an overlapping flanged engagement $21^a$ and said sections are retained in engagement by means of the studs 18 which extend transversely through the wheel rim and have their reduced ends detachably fastened to the outer surfaces of the rim by the lock nuts 19. The inner surface of the wheel rim is provided with an opening $20^a$ which alines with the studs 18, and each opening is spanned by a rim plate $15^a$. The shanks 16 extend through said openings $20^a$ and are equipped with an elongated end plate $16^a$ which straddle the studs 18, the ends $16^b$ of said plate being hook-shaped.

The outer portion of the rim is sealed by a metal bed plate 22 which is retained in the rim by the side flanges $22^a$ of the sections 20—21, said bed plate providing a seat for the resilient tire 23 which is clamped between the rim sections by means of the studs 18 and lock nuts 19.

Rollers 17 are provided to facilitate longitudinal movements of the plates $16^a$ in the wheel rim. Two rollers are associated with each plate, one on each side of the stud 18 which the plate straddles. The movement of said rollers is limited in one direction by the hook-shaped ends of said plates and in an opposite direction by the studs 18.

It will be seen from the foregoing that the described manner of connecting the spokes with the wheel rim permits said spokes to yield so that shocks and jars will be absorbed and also that by means of the roller engagement between plates $16^a$ and the bed-plate 22, the load will be transferred to said bed plate.

When the improved wheel is used as a driver it will be seen that the hub and spokes at the start will move independently of the rim until one of the rollers 17 is brought into contact with stud 18, which, of course causes the rim to travel with the spokes and hub.

What I claim as my invention is:—

1. A wheel comprising a hub, hollow spokes radiating therefrom, a hollow rim provided with openings, a tire for said rim, studs in said rim arranged beneath each opening, a shank extending through each opening and having a plate on its outer end that straddles said studs, rollers between said plate and said rim, a head carried by each shank and entering the spokes, a spring in each spoke and interposed between the shank head and the hub, a plate spanning each rim opening and provided with a guide sleeve for the said shanks, said sleeves telescoping with the free ends of the spokes, and a spring carried by each shank and interposed between the head thereof and the free ends of said sleeves.

2. A wheel comprising a hollow rim provided with openings, a stud beneath each opening, a plate straddling each stud, rollers interposed between each plate and the rim, a shank entering each opening and engaging the plate, a hub, hollow spokes radiating therefrom, said shanks slidably mounted in the free end portions of said spokes, and means in said spokes opposing the slidable movements of said shanks.

3. A wheel comprising a hub, hollow spokes carried thereby, a hollow rim formed in separable sections, said rim provided with openings, lugs within said rim beneath said openings, plates in said rim and straddling said lugs, rollers carried by said plates, shanks carried by said plates and projecting through said openings, sleeves for said shanks provided with rim-engaging plates, said sleeves and shanks slidable in said spokes, and means for opposing sliding movement of said shanks and sleeves.

OTTO G. WORSLEY.

Witnesses:
JOHN R. GIFFEN,
EDWIN G. LOW.